US012657119B2

(12) United States Patent
Chokkaram

(10) Patent No.: US 12,657,119 B2
(45) Date of Patent: Jun. 16, 2026

(54) SELF-CONTAINED MOBILE APPLICATION PROCESSING AND INTEGRATION

(71) Applicant: Caret Holdings, Inc., Columbus, OH (US)

(72) Inventor: Karthik Chokkaram, Chicago, IL (US)

(73) Assignee: CARET HOLDINGS, INC., Columbus, OH (US)

( * ) Notice: Subject to any disclaimer, the term of this patent is extended or adjusted under 35 U.S.C. 154(b) by 99 days.

(21) Appl. No.: 17/931,840

(22) Filed: Sep. 13, 2022

(65) Prior Publication Data

US 2024/0086307 A1     Mar. 14, 2024

(51) Int. Cl.
*G06F 11/3698* (2025.01)
*G06F 8/41* (2018.01)

(52) U.S. Cl.
CPC .......... *G06F 11/3698* (2025.01); *G06F 8/433* (2013.01); *G06F 8/44* (2013.01)

(58) Field of Classification Search
CPC ......... G06F 11/3664; G06F 8/433; G06F 8/44
See application file for complete search history.

(56) References Cited

U.S. PATENT DOCUMENTS

| | | | | |
|---|---|---|---|---|
| 9,116,768 B1 * | 8/2015 | Sawhney | .................. | G06F 8/60 |
| 10,904,376 B1 * | 1/2021 | Petri | ..................... | H04W 4/021 |
| 2007/0250606 A1 * | 10/2007 | Tseitlin | ..................... | G06F 8/51 |
| | | | | 709/220 |

| | | | | |
|---|---|---|---|---|
| 2012/0151450 A1 * | 6/2012 | Saffer | ................. | G06F 11/3664 |
| | | | | 717/130 |
| 2013/0151996 A1 * | 6/2013 | Nario | .................... | H04W 12/06 |
| | | | | 715/760 |
| 2015/0081764 A1 * | 3/2015 | Zhao | ....................... | G06F 9/452 |
| | | | | 709/203 |
| 2016/0054988 A1 * | 2/2016 | Desire | ................... | H04L 67/025 |
| | | | | 717/176 |

(Continued)

OTHER PUBLICATIONS

Chang, Guiran, et al. "Developing mobile applications on the Android platform." Mobile Multimedia Processing: Fundamentals, Methods, and Applications (2010): 264-286. (Year: 2010).*

(Continued)

*Primary Examiner* — Bradley A Teets
*Assistant Examiner* — Joanne G Macasiano
(74) *Attorney, Agent, or Firm* — SCHWEGMAN LUNDBERG & WOESSNER, P.A.

(57)     ABSTRACT

A developer's application (app) is compiled and linked to a first processing environment associated with a cloud/server. Metadata is created to define the source code for the app, source code used with the app from the first processing environment, and settings for the app and the first processing environment. The metadata is stored on cloud/server location associated with a link. Optionally, the link is published to message threads/boards and/or a task of a workflow. A user of a mobile device provides the link/code within the context of a mobile app of the mobile device. The mobile app obtains the metadata using the link from the location and instantiates a container/shell that is provided the metadata. The container/shell configures as a self-contained instance of the developer's app within a second and self-contained processing environment and the self-contained instance is executed within a user interface window of the mobile app.

16 Claims, 3 Drawing Sheets

(56) References Cited

U.S. PATENT DOCUMENTS

| 2016/0179495 | A1* | 6/2016 | Wu | G06F 21/64 |
| | | | | 717/175 |
| 2016/0378439 | A1* | 12/2016 | Straub | G06F 8/61 |
| | | | | 717/107 |
| 2017/0242665 | A1* | 8/2017 | Wang | G06F 8/71 |
| 2019/0230130 | A1* | 7/2019 | Beckman | H04W 12/35 |
| 2022/0350629 | A1* | 11/2022 | Parry-Barwick | G06F 8/65 |
| 2023/0169168 | A1* | 6/2023 | Magen Medina | G06F 9/45558 |
| | | | | 726/23 |

OTHER PUBLICATIONS

Sæther, Didrik. Security in Docker swarm: Orchestration service for distributed software systems. MS thesis. The University of Bergen, 2018. (Year: 2018).*

Souppaya, Murugiah, John Morello, and Karen Scarfone. Application container security guide. No. NIST Special Publication (SP) 800-190 (Draft). National Institute of Standards and Technology, 2017. (Year: 2017).*

Zimmermann, M., Breitenbücher, U., Harzenetter, L., Leymann, F., & Yussupov, V. (2020). Self-contained Service Deployment Packages. In Closer (pp. 371-381). (Year: 2020).*

Jaramillo, David, et al. "A secure extensible container for hybrid mobile applications." 2013 Proceedings of IEEE Southeastcon. IEEE, 2013. (Year: 2013).*

* cited by examiner

200

SELF-CONTAINED MOBILE APPLICATION PROCESSING AND INTEGRATION

Application testing can be complicated and difficult for individuals not formally trained as programmers. Yet, good software development necessitates that independent testers perform quality assurance tests on a developer's application or portion of an overall application provided by the developer. This is because the developer has a vested interest in the code and may have a variety of reasons for not thoroughly testing the code. Developers can frequently be under time constraints, can simultaneously be assisting technical support in resolving issues associated with other applications provided by the developer, can be actively engaged on a new coding project, may not want to be associated with code that may be viewed as "buggy" such that objectivity of the developer is questioned, etc. Thus, there are a variety of reasons why disinterested and objective testers are part of good software development practices within an organization The problem with independent testers is that they are often not developers or not as skilled as developers. Programming resources are scarce within organizations such that using a developer for code testing is a waste of limited and skilled resources. However, non-programming resources are not as skilled and frequently need to consult with the developer, which calls into question whether it is the developer testing or the independent quality assurance tester and also distracts the developer away from current work.

As a result, organizations try and find testers that have good technical skills but are not quite skilled enough to be a developer. But even with these types of testers there are frequently issues that arise for the testers. These issues are associated with just being able to set up a processing environment for testing the code because the appropriate software resources used by the code have to be located and referenced properly to successfully execute the code before testing can even begin.

DETAILED DESCRIPTION

Figure 1:
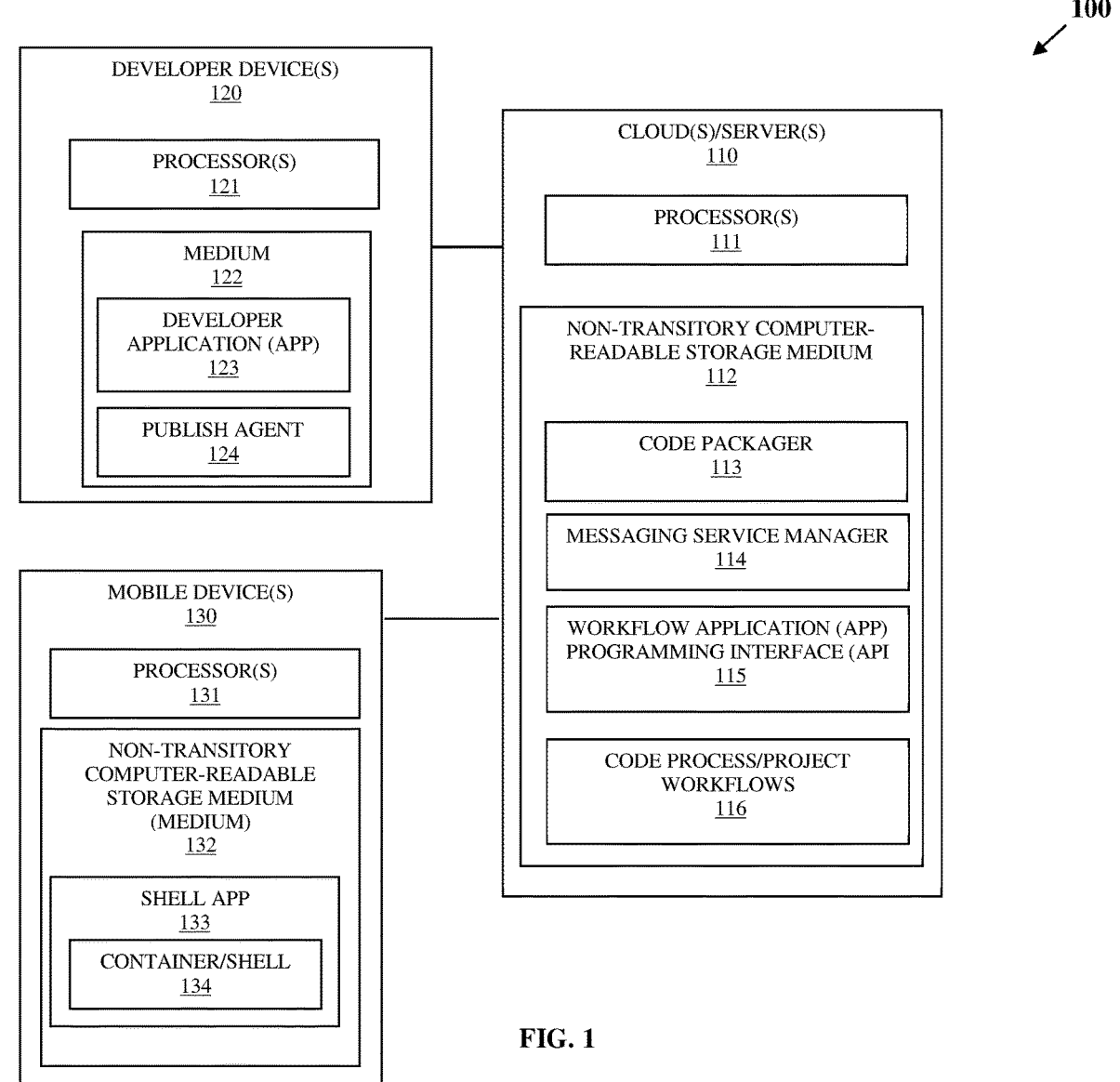
FIG. 1 is a diagram of a system for self-contained mobile application processing and integration, according to an example embodiment.

Because of the issues associated with testing discussed above, frequently developers have to package their applications together in designated processing environments for the testers to being testing. This frequently takes a substantial amount of time of the developers. Moreover, it can tax server resources associated with the test processing environment while other testers are performing tests and developers are trying to properly configure, compile, and link their applications within the testing processing environment for the designated tester. Moreover, the testers need to access the internal testing environment, which means the testers probably have to be on a desktop or laptop and likely cannot perform their tests via a mobile device. Even assuming mobile access to the test processing environment is available to the tester, the browser-based interface of the mobile device likely not conducive nor compatible with the server, such that accessing/viewing options, navigating, performing tests, and evaluating results can be time-consuming, impractical, and potentially not even possible. Thus, the testers likely have to have their laptop or desktop setup and their current location and have to be logged into the test processing environment, which restricts timely testing functions because the testers may not be in situations nor environments where their laptops or desktops are available.

Furthermore, the issues discussed heretofore are not limited to testing or testers since analysts are often need to run developer applications for a variety of reasons. An analyst is general someone with specific business domain knowledges that interacts with developers to obtain tools (applications) that assist the analyst in making business decisions for an organization. Analysts are generally even less technically skilled than testers, such that interaction with developers is required more frequently that what is associated with testers. Analysts also have to use a laptop or a desktop to access the developer's application on the organization's internal cloud/server, which means, similar to testers, analysts cannot run a developer's application anytime and anywhere but is rather restricted to specific environments and situations.

In various embodiments, methods and a system for self-contained application testing and integration are provided. A publishing agent is provided on a developer-operated device that compiles (when necessary), links, and sends an executable associated with a developer's application source code to a code packager of a cloud/server. The code packager collects metadata associated with the executable, the metadata includes the source code of the executable, source code libraries used within the source code, settings, digital certificates, file resources, etc. The code packager then generates a Universal Resource Locator (URL) link to the metadata and may optionally generate a Quick Response (QR) code or a barcode encoded with the address of the URL. The URL link or code (QR code or barcode) is returned to the agent on the developer's device. The developer can then use a user interface associated with the publishing agent to publish the URL link or code to messaging services via messaging service manager 114 or to internal development project workflows with a workflow Application Programming Interface (API). The URL link or code is then integrated into message threads or internal workflow tasks where a tester or an analyst can access.

An analyst or tester who has a need to execute the developer's application or a need to test the developer's application uses a shell app on a mobile device to provide the URL link or scan the code off the corresponding messaging thread or workflow task. Shell app traverses to the URL link automatically once entered or decoded from a scan of the code and grabs the metadata off the site, the metadata created and generated by the code packer. The shell app initiates a container/shell (an interface window that is a self-contained processing environment) within a processing context of the shell app and provides the metadata. The container/shell uses the metadata to obtain the source code, file resources, source code libraries, settings, and digital certificates to configure, compile (optional), and link into an executable instance of the developer's application. The executable instance is then initiated within a window/shell/containers of the shell app where the analyst/tester runs the developer's application. This execution of the developer's app occurs independently of the cloud such that hardware and software resources are not impacted on the server. Moreover, since the developer's application is run completely on the analyst's/tester's mobile device within the container/shell window of the shell app, the analyst/tester can run the developer's application at any location and any time and is not required to use a specific laptop or desktop setup to access the cloud. The analyst/tester may then use any existing interfaces associated with messaging services or internal workflows and provide an assessment of the developer's app or an analyst may use results of the developer's app to perform an analysis. This speeds the software development process and analysts analysis processes, decreases hardware and software load on the cloud associated with software development, and make a least a portion of the software development process and analysts analysis processor portable.

FIG. 1 is a diagram of a system for self-contained mobile application processing and integration, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of self-contained mobile application processing and integration, presented herein and below.

System 100 includes one or more clouds 110 or servers 110 (hereinafter just "cloud" 110", one or more developer devices 120, and one or more mobile devices 130. Cloud 110 includes at least one processor 111, a non-transitory computer-readable storage medium (hereinafter just "medium") 112. Medium 112 includes executable instructions for a code packer 113, a messaging service manager 114, a workflow API 115 and code process/project workflows 116. The executable instructions when executed by processor 111 cause processor 111 to perform operations discussed herein and below with respect to 113-116.

Each developer device 120 includes a processor 121 and a medium 122, which includes executable instructions for a developer app 123 and a publish agent 124. The executable instructions when executed by processor 121 cause processor 121 to perform operations discussed herein and below with respect to 121-124.

Each mobile device 130 includes a processor 131 and a medium 132, which includes executable instructions for a shell app 133 and container/shell 134. The executable instructions when executed by processor 131 cause processor 131 to perform operations discussed herein and below with respect to 133-134.

A developer utilizing device 120 and/or cloud 110 via device 120 develops and application 123 or an independent portions of an application 123 using existing software development tools. When the developer is ready to release the application 123 for testing or for use by an analyst, the developer uses publishing agent 124 to compile (optional when the source code is an interpretive language), link, and create an executable for the application 123 within the proper processing environment on cloud 110. This causes code packager 113 to obtain metadata for the application 123, the metadata can be associated with both the application 123 and the processing environment of the executable for the application 123 within the cloud 110. The metadata includes source code for the application 123, source code libraries associated with the processing environment and used by the application 123, digital certificates associated with the code, digital certificates associated with the processing environment, settings associated with the application 123 and the processing environment, operating system (OS) type, and/or operating system settings.

Code packer 113 stores the metadata for the app 123 on a web site accessible via a unique URL link. Optionally, code packer 113 encodes the URL address in a code (QR code or barcode). The URL link and/or code are provided back to publish agent 124 through a user interface of agent 124.

The developer then decides where to publish the URL and/or Code. The URL link and/or code can be published by the developer by making a post to a message thread associated with a project team or may uses manager 114 for this purposes. Alternatively, the developer can publish the URL link and/or code directly to an internal organizational workflow 112 using API 115. The developer can use the user interface of agent 124 to identify the workflow 116 and related task and agent 124 interacts with API 115 to cause the URL link and/or code to be published to the task within the corresponding workflow 116.

Once the URL link and/or code is published to a developer determined message thread/broad and/or task of developer designated workflow 116. An analyst or a tester can operate there mobile device 130 loaded with shell app 133 to enter through a user interface of shell app 133 the published URL link on the message thread/board and/or in the task of the workflow 116 or the developer can use an integrated camera associated with device 130 within the user interface of shell app 133 to scan the code from the message thread/board and/or task of the workflow 116.

Any code scanned within app 133 is decoded to obtain the URL link and app 133 traverses to the address associated with the URL link and downloads the corresponding metadata for the developer app 123. Shell app activates an instance of container/shell 134 as a separate user interface window within the processing context of shell app 133 and provides container/shell 134 the metadata. The instance of container/shell 134 uses the source code of the app 123, the source code libraries associated with the processing environment and used by the application 123, digital certificates associated with the code, digital certificates associated with the processing environment, settings associated with the application 123 and the processing environment, operating system (OS) type, and/or operating system settings to compile (optional) and link with the settings such that the container/shell instance 134 because a self-contained processing environment for the developer's app 123. Compiling may be optional when the source code itself is an interpreted source code language. An executable instance of app 123 is instantiated within the window of the user interface for shell app 133 as an executing instance of container/shell 134. The analyst/tester that uses options presented with the app 123 through the window and runs the self-contained executable version of developer app 123. The analyst/tester can note results of running app 123 and perform analysis or compile the results for purposes of further actions needed based on the results by the analyst/tester. For example, a tester may access an appropriate code process/project workflow 116 and provide results associated with a test. An analyst may feed the results to a second cloud-based application or system for purposes of further analysis associated with actions of the analyst.

In an embodiment, the publish agent 124 resides on cloud 110. In this embodiment, the developer accesses the publish agent 124 via a cloud interface on device 120.

In an embodiment, the operations associated with the publish agent 124 are subsumed into a compiling and linking process initiated by the developer on cloud 110 for purposes of installing an executable version of app 123 with a testing or analyst processing environment within an organization. The process is modified to include the operations discussed above with respect to agent 124.

In an embodiment, publish agent 124 provides a user interface to developer that permits the developer to identify the messaging treads/board where the URL link or code is to be published when the developer compiles, links, and installs an executable instance of app 123 within a testing or analyst processing environment within an organization associated with cloud 110. This permits code packer 113 to publish the URL link or code directly to the message thread/board and/or task of a given workflow 116 using manager 114 and API 115 without separately presenting an interface window back to the developer for purposes of publishing the URL link and/or code.

In an embodiment, the developer uses existing applications or tools to manually publish the URL link or code without the need for manager 114 and/or API 115. In this case, the developer engaged in an existing message thread/board adds a message using the appropriate messaging service that includes the URL link and/or code. The developer may also use an existing workflow interface to post the URL link and/or code directly into a task of a given workflow 116. In an embodiment, the developer texts messages the URL link and/or code to a given device 130 associated with a tester or an analyst.

In an embodiment, a given workflow 116 is modified to include automatically publishing of the URL link and/or code when notified through API 115 of the presence of the metadata for app 123. Here, code packer 113 uses API 115 to notify workflow 116 of the metadata at the URL link address.

The above referenced embodiments and other embodiments are now discussed with reference to FIGS. 2 and 3.

Figure 2:
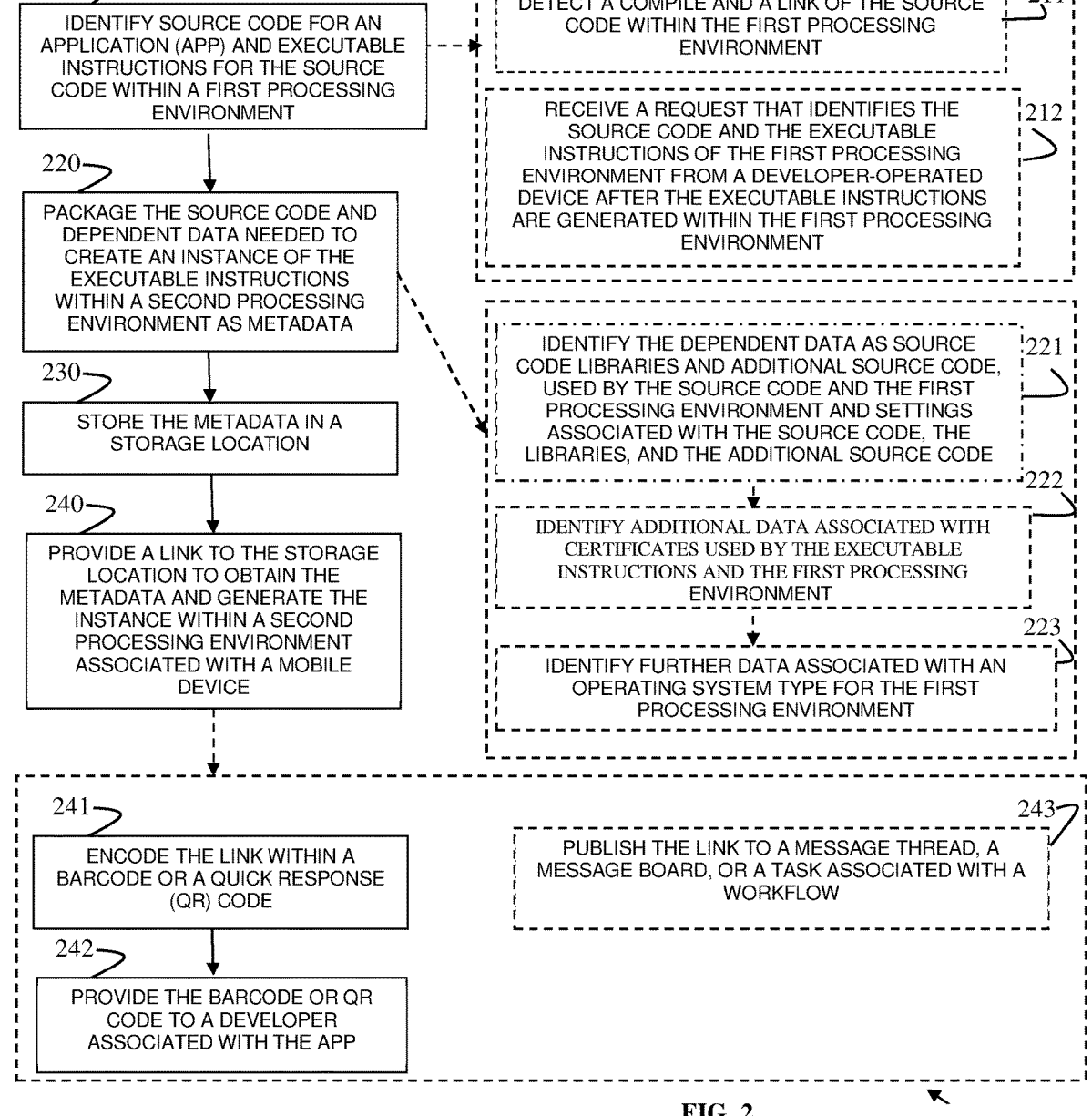
FIG. 2 is a flow diagram for self-contained mobile application processing and integration, according to an example embodiment.

FIG. 2 is a flow diagram of a method 200 for self-contained mobile application processing and integration, according to an example embodiment. The software module(s) that implements the method 200 is referred to as a "server-based code packager." The server-based code packager is implemented as executable instructions programmed and residing within memory and/or a non-transitory computer-readable (processor-readable) storage medium and executed by one or more processors of one or more devices. The processor(s) of the device(s) that executes the server-based code packager are specifically configured and programmed to process the server-based code packager. The server-based code packager may have access to one or more network connections during its processing. The network connections can be wired, wireless, or a combination of wired and wireless.

In an embodiment, the device that executes the server-based code packager is the cloud 110. In an embodiment, the device that executes the server-based code packager is server 110.

In an embodiment, the server-based code packager is all or some combination of 113, 114, 115, 116, and/or 124. The server-based code packager presents another and, in some ways, enhanced perspective of system 100.

At 210, the server-based code packager identifies source code for an application 123 and executable instructions for the source code within a first processing environment. The first processing environment associated with a cloud 110 or server 110 processing environment for the source code of the application 123 was compiled (when needed) and linked within the cloud/server 110 processing environment as the executable instructions.

In an embodiment, at 211, the server-based code packager detects a compile and link of the source code within the first processing environment. This can be through an explicit request as discussed above with system 100 via agent 124 or this can be done after the executable instructions are detected within the first processing environment.

In an embodiment, at 212, the server-based code packager receives a request that identifies the source code and the executable instructions of the first processing environment from a developer-operated device 120 after the executable instructions are generated within the first processing environment. In this embodiment, a developer uses a server interface to notify the server-based code packager of the executable instructions and associated source code for the application 123.

At 220, the server-based code packager packages the source code and dependent data needed to create an instance of the executable instructions within a second processing environment as metadata. The dependent data can comprise a variety of information needed to create a self-contained processing environment to process or to execute the executable instructions of the application 123.

For example and at 221, the server-based code packager identifies the dependent data as source code libraries used by the source code of app 123 and additional source code used by resources of the first processing environment during processing of the executable instructions. The server-based code packager can also identify the dependent data as settings associated with the source code of app 123, the source code libraries, and the first processing environment.

In an embodiment of 221 and at 222, the server-based code packager identifies additional data associated with the dependent data, which is associated with certificates used by the executable instructions and the first processing environment. The certificates provide authentication of the source code and authorize the executable instructions to process within the first processing environment.

In an embodiment of 222 and at 223, the server-based code packager identifies further data associated with an operating system (OS) type for the first processing environment. In an embodiment, the OS is an Android® OS, iOS®, Windows®, or other OSs.

At 230, the server-based code packager stores the metadata in a storage location. It is noted that the metadata can also includes instructions for using the metadata. The storage location is associated with a cloud 110 or server 110 accessible storage. In an embodiment, the storage location is accessible via a website address.

At 240, the server-based code packager provides a link to the storage location to obtain the metadata and to generate the instance of the app 123 or the executable instructions within a second and self-contained processing environment associated with a mobile device 130. In an embodiment, at 241, the server-based code packager encodes the link within a barcode or QR code. In an embodiment of 241 and at 242, the server-based code packager provides the barcode or QR code to a developer associated with app 123 through a server interface or through a user interface associated with agent 124.

In an embodiment, at 243, the server-based code packager publishes the link to a message thread, a message board, or a task associated with a workflow 116. This can be done through direction of the developer or done based on configured parameters associated with the app 123 or the developer on behalf of the developer.

Figure 3:
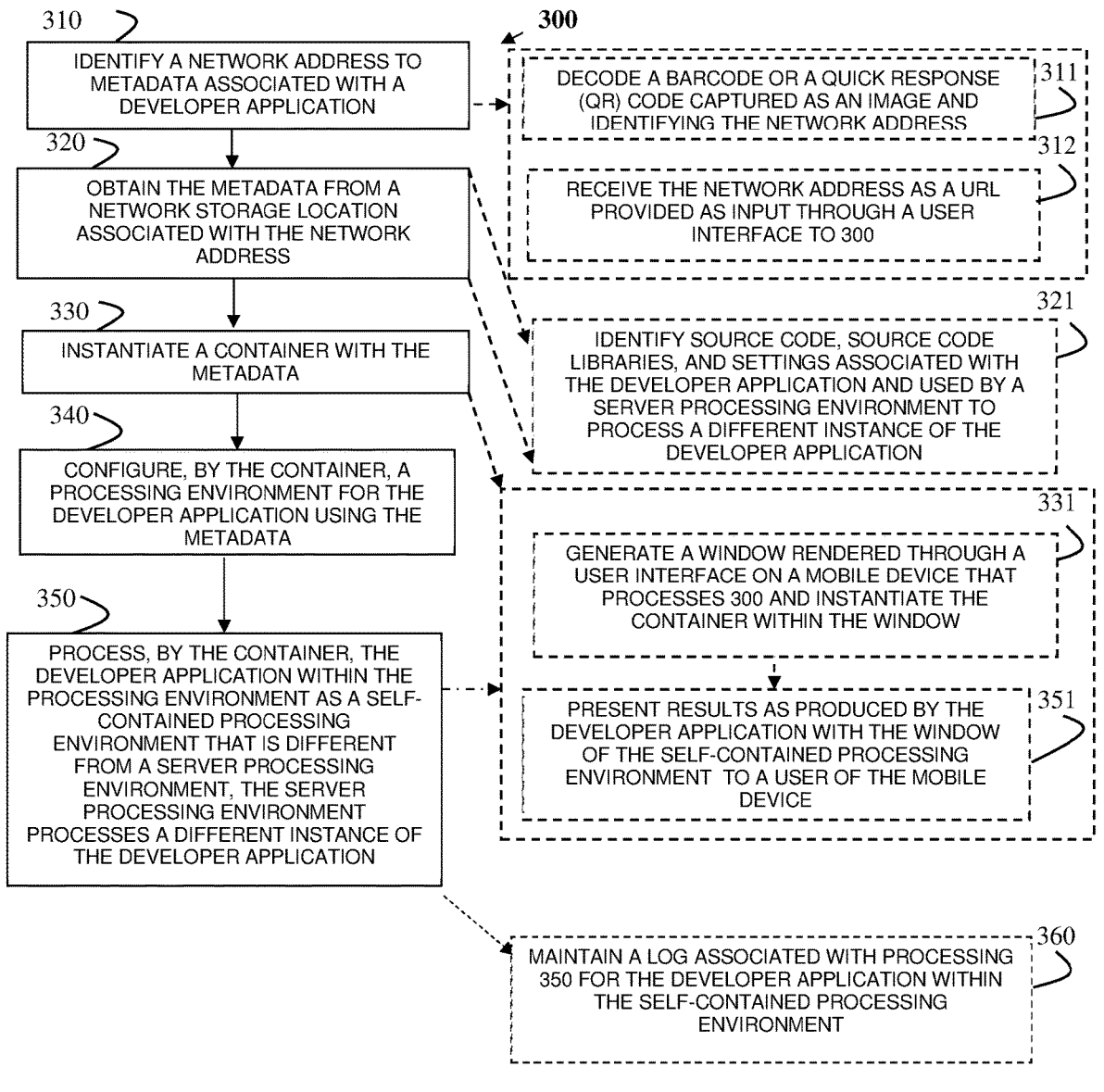
FIG. 3 is a flow diagram of another method for self-contained mobile application processing and integration, according to an example embodiment.

FIG. 3 is a flow diagram of another method 300 for self-contained mobile application processing and integration, according to an example embodiment. The software module(s) that implements the method 300 is referred to as a "shell app." The shell app is implemented as executable instructions programmed and residing within memory and/or a non-transitory computer-readable (processor-readable) storage medium and executed by one or more processors of one or more devices. The processors that execute the shell app are specifically configured and programmed to process the features integrator. The shell app may have access to one or more network connections during its processing. The network connections can be wired, wireless, or a combination of wired and wireless.

In an embodiment, the device that execute the shell app is the mobile device 130. In an embodiment, mobile device 130 is a phone, a laptop, or a wearable processing device.

In an embodiment, the shell app is all of, or some combination of 132 and/or 134. The shell app interacts with cloud 110 or server 110 and the method 200 for purposes of downloading metadata stored in cloud or server location for developer app 122.

At 310, the shell app identifies a network address to metadata associated with a developer app 123. This can be done in a few manners.

For example, at 311, the shell app decodes a barcode or QR code captured as an image by a camera of the mobile device 120 that executes the shell app. The shell app identifies the network address from the decoded barcode or QR code.

In another case, at 312, the shell app receives the network address as a URL link provided as input through a user interface to 300. In an embodiment, an image of the URL link is captured, and image processed by the shell app to obtain the URL link in electronic text format.

At 320, the shell app obtains and downloads the metadata from a network storage location associated with the network address. The metadata is downloaded to the mobile device 130 that executes the shell app.

In an embodiment, at 321, the shell app identifies source code for the app 123, source code libraries used by the app 123, any additional source code, and settings, which are used by a server processing environment when processes a different instance of app 123. That is the resources and resource settings along with instructions for compiling and linking the resources of app 123 are identified in the metadata.

At 330, the shell app instantiates a container with the metadata. In an embodiment, at 331, the shell app generates a window rendered through a user interface on a display of the mobile device 130 that processes the shell app. The shell app instantiates the container within the window.

At 340, the container configures a processing environment for the developer app 123 using the metadata. At 350, the container processes the developer app 123 within the processing environment as a self-contained processing environment. The self-contained processing environment is different from the server processing environment. The server processing environment processes a different instance of the developer app 123 on a cloud 110 or a server 110.

In an embodiment of 331 and 350, at 351, the shell app presents or renders results as the results are produced by the developer application within the window of the self-contained processing environment to a user of the mobile device 130. In an embodiment, the user is a code tester or an analyst. As or while app 123 executes within the window of the self-contained processing environment, the window presents results or responses generated by the app 123 to the user.

In an embodiment, at 360, the shell app maintains a log associated with processing the app 123 at 350 within the self-contained processing environment. The log can comprise user inputs, responses to the inputs provided by app 123, and events generated by app 123 during its processing. The log can be analyzed to determine responsiveness and correct operation of app 123.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

identifying source code for an application and executable instructions for the source code within a first processing environment;

packaging the source code and dependent data needed to create an instance of the executable instructions within a second processing environment as metadata, wherein the dependent data includes digital certificates and settings associated with the first processing environment;

storing the metadata in a storage location; and providing a link to the storage location to obtain the metadata and generate the instance within the second processing environment of a mobile device, wherein the link is encoded within a quick response (QR) code, wherein the second processing environment is a self-contained processing environment that is different from the first processing environment;

wherein the metadata includes instructions for using the metadata to compile and link the source code and dependent data into an executable instance of the application within the self-contained processing environment;

wherein the instance is initiated within a window of a shell app where an analyst or a tester runs the application, and wherein the shell app provides the metadata to obtain the source code, file resources, source code libraries, settings, and digital certificates to configure, compile, and link into the instance of the application.

2. The method of claim 1, wherein identifying further includes detecting a compile and a link of the source code within the first processing environment.

3. The method of claim 1, wherein identifying further includes receiving a request that identifies the source code and the executable instructions of the first processing environment from a developer-operated device after the executable instructions are generated within the first processing environment.

4. The method of claim 1, wherein packaging further includes identifying the dependent data as source code libraries used by the executable instructions, additional source code provided by the first processing environment to the executable instructions, and the settings associated with the source code, the source code libraries, and the additional source code.

5. The method of claim 4, wherein identifying the dependent data further includes identifying the dependent data as additional data associated with the digital certificates used by the executable instructions within the first processing environment.

6. The method of claim 5, wherein identifying the dependent data further includes identifying the dependent data as further data associated within an operating system (OS) type for the first processing environment.

7. The method of claim 1, wherein providing further includes providing the QR code to a developer who is associated with the application.

8. The method of claim 1, wherein providing further includes publishing the link to a message thread, message board, or to a task of a workflow associated with the application.

9. A method, comprising:
identifying a network address to metadata associated with a developer application;
obtaining the metadata from a network storage location associated with the network address;
instantiating a container with the metadata within a mobile device;
configuring, by the container within the mobile device, a processing environment for the developer application using the metadata, wherein the metadata includes source code, source code libraries, settings, and digital certificates associated with the developer application;
processing, by the container, the developer application within the processing environment as a self-contained processing environment that is different from a server processing environment, wherein the server processing environment processes a different instance of the developer application, and wherein the processing includes compiling and linking the source code based on the metadata, wherein the self-contained processing environment is configured to process the developer application independently of the server processing environment;
wherein the container presents results as produced by the developer application within the processing environment within a window rendered through a user interface to a user of the mobile device;
wherein a shell application (app) activates an instance of the container as a separate user interface window within a processing context of the shell app, and wherein the shell app provides the metadata to the container wherein the container uses metadata to obtain the source code, file resources, source code libraries, settings, and digital certificates and link into an executable instance of the developer application.

10. The method of claim 9, wherein identifying further includes decoding a barcode or a Quick Response (QR) code captured as an image and identifying the network address.

11. The method of claim 9, wherein identifying further includes receiving the network address as a Uniform Resource Locator (URL) link provided by as input through a user interface of the method.

12. The method of claim 9 further comprising, maintaining a log associated with the processing of the developer application within the self-contained processing environment.

13. A system, comprising:
at least one server system comprising at least one server having at least one server processor and a server non-transitory computer-readable storage medium having server executable instructions;
a mobile device comprising at least one mobile processor and a mobile non-transitory computer-readable storage medium having mobile executable instructions;
the server executable when executed by the at least one server processor from the server non-transitory computer-readable storage medium causes the at least one server processor to perform first operations comprising:
generating metadata for source code, source code libraries, and settings associated with processing a developer application within a server processing environment;
storing the metadata in a server storage location; and
providing a link to the server storage location, wherein the link is encoded within a quick response (QR) code,
the mobile executable instructions when executed by the at least one mobile processor from the mobile non-transitory computer-readable storage medium causes the at least one mobile processor to perform second operations comprising:
obtaining the metadata using the link by decoding the QR code;
generating a window rendered on the mobile device to a user;
configuring, within the window, an instance of the developer application within a self-contained processing environment of the window based on the metadata; and
instantiating the instance of the developer application within the self-contained processing environment of the window for monitoring by the user wherein the self-contained processing environment executes the instance of the developer application independently of the server processing environment;
wherein an executable instance of the developer application is instantiated within the window of a user interface for a shell application as an executing instance of a container, and wherein the shell application activates an instance of the container a separate user interface window within a processing context of the shell application;
wherein the instance of the developer application is instantiated as a separate user interface window within a processing context of the shell application on the mobile device.

14. The system of claim 13, wherein the mobile device is a phone, a tablet, a laptop, or a wearable processing device.

15. The system of claim 13, wherein the first operations associated with the providing further includes encoding the link within a barcode or a Quick Response (QR) code and publishing the barcode or the QR code to a message thread, a message board, or to a task of a workflow associated with the developer application.

16. The system of claim 15, wherein the second operations associated with the obtaining further includes obtaining an image of the barcode or the QR code taken by a camera of the mobile device, decoding the barcode or the QR code and using the link to access the server storage location and download the metadata to the mobile device.

* * * * *